United States Patent
Wintermantel

(10) Patent No.: US 9,182,476 B2
(45) Date of Patent: Nov. 10, 2015

(54) RADAR SYSTEM HAVING ARRANGEMENTS AND METHODS FOR THE DECOUPLING OF TRANSMITTING AND RECEIVING SIGNALS AND FOR THE SUPPRESSION OF INTERFERENCE RADIATION

(75) Inventor: Markus Wintermantel, Lindau (DE)

(73) Assignee: Conti Temic microelectronic GmbH, Nuremberg (DE)

( * ) Notice: Subject to any disclaimer, the term of this patent is extended or adjusted under 35 U.S.C. 154(b) by 82 days.

(21) Appl. No.: 13/256,488

(22) PCT Filed: Apr. 1, 2010

(86) PCT No.: PCT/DE2010/000417
§ 371 (c)(1),
(2), (4) Date: Sep. 14, 2011

(87) PCT Pub. No.: WO2010/115418
PCT Pub. Date: Oct. 14, 2010

(65) Prior Publication Data
US 2012/0001791 A1  Jan. 5, 2012

(30) Foreign Application Priority Data
Apr. 6, 2009 (DE) .......................... 10 2009 016 478

(51) Int. Cl.
*G01S 7/292* (2006.01)
*G01S 7/02* (2006.01)
(Continued)

(52) U.S. Cl.
CPC ............... *G01S 7/2926* (2013.01); *G01S 7/023* (2013.01); *G01S 7/038* (2013.01); *G01S 7/2928* (2013.01); *G01S 13/931* (2013.01); *G01S 13/343* (2013.01); *G01S 2007/356* (2013.01)

(58) Field of Classification Search
CPC ....... G01S 7/023; G01S 7/038; G01S 7/2926; G01S 7/2928; G01S 13/343; G01S 13/931; G01S 2007/356
USPC ...................................................... 342/70–72
See application file for complete search history.

(56) References Cited

U.S. PATENT DOCUMENTS 4,044,354 A   8/1977  Bosher et al.
4,328,495 A   5/1982  Thue
(Continued)

FOREIGN PATENT DOCUMENTS

DE    2 312 145    9/1973
DE    31 16 562    8/1982
(Continued)

OTHER PUBLICATIONS

International Search Report of the International Searching Authority for International Application PCT/DE2010/000417, mailed Oct. 18, 2010, 3 pages, European Patent Office, HV Rijswijk, Netherlands.
(Continued)

*Primary Examiner* — Matthew M Barker
(74) *Attorney, Agent, or Firm* — W. F. Fasse

(57) ABSTRACT

Using a radar system in a motor vehicle, high frequency individual signal pulses are transmitted from at least one transmitting antenna, and at least one receiving antenna receives reception signals formed by reflection of the transmitted signal pulses from objects in the surroundings. The reception signals are mixed with the high-frequency signal to produce low-frequency mixed signals representing the sequence of individual signal pulses. The phase angle of the mixed signals is varied over successive individual signal pulses thereof by varying the phase angle of: the successive individual transmitted signal pulses, the high-frequency signals used for the mixing, and/or the mixed signals. In further processing of the mixed signals to determine the distance and the relative velocity of detected objects, an interference component can be separated and/or suppressed from a useful signal component because the useful signal component has the known phase angle variation but the interference component does not.

25 Claims, 9 Drawing Sheets

(51) Int. Cl.
*G01S 7/03* (2006.01)
*G01S 13/93* (2006.01)
*G01S 7/35* (2006.01)
*G01S 13/34* (2006.01)

(56) References Cited

U.S. PATENT DOCUMENTS

| | | | |
|---|---|---|---|
| 4,622,552 A | 11/1986 | Andrews et al. | |
| 4,901,083 A * | 2/1990 | May et al. | 342/128 |
| 5,008,678 A | 4/1991 | Herman | |
| 5,134,411 A * | 7/1992 | Adler | 342/130 |
| 5,202,742 A | 4/1993 | Frank et al. | |
| 5,454,442 A | 10/1995 | Labuhn et al. | |
| 5,523,764 A | 6/1996 | Martinez et al. | |
| 5,530,447 A | 6/1996 | Henderson et al. | |
| 5,579,021 A | 11/1996 | Lee | |
| 5,633,642 A | 5/1997 | Höss et al. | |
| 5,657,024 A | 8/1997 | Shingyoji et al. | |
| 5,686,923 A | 11/1997 | Schaller | |
| 5,717,399 A | 2/1998 | Urabe et al. | |
| 5,724,042 A | 3/1998 | Komatsu et al. | |
| 5,760,886 A | 6/1998 | Miyazaki et al. | |
| 5,774,091 A | 6/1998 | McEwan | |
| 5,805,110 A | 9/1998 | McEwan | |
| 5,815,112 A | 9/1998 | Sasaki et al. | |
| 5,825,333 A | 10/1998 | Kudoh et al. | |
| 5,877,726 A | 3/1999 | Kudoh et al. | |
| 5,923,280 A | 7/1999 | Farmer | |
| 5,940,011 A | 8/1999 | Agravante et al. | |
| 5,949,365 A | 9/1999 | Wagner | |
| 5,963,163 A | 10/1999 | Kemkemian et al. | |
| 5,986,602 A | 11/1999 | Frink | |
| 6,014,108 A | 1/2000 | Lynch et al. | |
| 6,028,548 A | 2/2000 | Farmer | |
| 6,057,797 A | 5/2000 | Wagner | |
| 6,091,363 A | 7/2000 | Komatsu et al. | |
| 6,097,332 A | 8/2000 | Crosby, II | |
| 6,122,602 A | 9/2000 | Michalski et al. | |
| 6,127,965 A | 10/2000 | McDade et al. | |
| 6,130,640 A | 10/2000 | Uematsu et al. | |
| 6,204,755 B1 | 3/2001 | Kikuchi | |
| 6,232,910 B1 | 5/2001 | Bell et al. | |
| 6,396,448 B1 | 5/2002 | Zimmermann et al. | |
| 6,480,160 B1 | 11/2002 | Bjornholt et al. | |
| 6,492,949 B1 | 12/2002 | Breglia et al. | |
| 6,563,456 B1 | 5/2003 | Hamman et al. | |
| 6,577,269 B2 | 6/2003 | Woodington et al. | |
| 6,587,074 B1 | 7/2003 | Winter et al. | |
| 6,646,620 B1 | 11/2003 | Bjornholt et al. | |
| 6,657,581 B1 | 12/2003 | Lippert et al. | |
| 6,683,557 B2 | 1/2004 | Pleva et al. | |
| 6,707,419 B2 | 3/2004 | Woodington et al. | |
| 6,717,544 B2 | 4/2004 | Nagasaku et al. | |
| 6,750,810 B2 | 6/2004 | Shinoda et al. | |
| 6,816,107 B2 | 11/2004 | Pleva et al. | |
| 6,833,806 B2 | 12/2004 | Nagasaku et al. | |
| 6,864,831 B2 | 3/2005 | Woodington et al. | |
| 6,897,819 B2 | 5/2005 | Henderson et al. | |
| 6,977,609 B2 | 12/2005 | Pleva et al. | |
| 7,038,614 B1 * | 5/2006 | Aker | 342/70 |
| 7,071,868 B2 | 7/2006 | Woodington et al. | |
| 7,109,938 B2 | 9/2006 | Franson et al. | |
| 7,132,976 B2 | 11/2006 | Shinoda et al. | |
| 7,154,432 B2 | 12/2006 | Nagasaku et al. | |
| 7,173,561 B2 | 2/2007 | Isaji | |
| 7,187,334 B2 | 3/2007 | Franson et al. | |
| 7,190,305 B2 * | 3/2007 | Isaji | 342/70 |
| 7,268,722 B2 | 9/2007 | Gottwald et al. | |
| 7,336,218 B2 | 2/2008 | Nishimura et al. | |
| 7,346,453 B2 | 3/2008 | Matsuoka | |
| 7,362,259 B2 | 4/2008 | Gottwald | |
| 7,391,361 B2 | 6/2008 | Kishida | |
| 7,420,502 B2 | 9/2008 | Hartzstein et al. | |
| 7,443,336 B2 | 10/2008 | Noda | |
| 7,453,411 B2 | 11/2008 | Nagai | |
| 7,466,260 B2 | 12/2008 | Ishii et al. | |
| 7,492,310 B2 | 2/2009 | Haberland et al. | |
| 7,567,201 B2 * | 7/2009 | Miyake | 342/70 |
| 7,576,701 B2 | 8/2009 | McGrath et al. | |
| 7,630,061 B2 | 12/2009 | Lehre et al. | |
| 7,663,533 B2 | 2/2010 | Toennesen et al. | |
| 7,760,133 B2 * | 7/2010 | Shirai et al. | 342/159 |
| 8,203,481 B2 | 6/2012 | Wintermantel et al. | |
| 8,339,526 B2 | 12/2012 | Minikey, Jr. et al. | |
| 8,390,507 B2 | 3/2013 | Wintermantel | |
| 8,436,763 B2 | 5/2013 | Wintermantel | |
| 2001/0026237 A1 | 10/2001 | Okai et al. | |
| 2002/0067314 A1 | 6/2002 | Takimoto et al. | |
| 2002/0075178 A1 | 6/2002 | Woodington et al. | |
| 2002/0163478 A1 | 11/2002 | Pleva et al. | |
| 2002/0175852 A1 | 11/2002 | Zoratti et al. | |
| 2003/0179131 A1 | 9/2003 | Brosche | |
| 2004/0239554 A1 * | 12/2004 | Eckel et al. | 342/70 |
| 2005/0057393 A1 * | 3/2005 | Henftling et al. | 342/28 |
| 2005/0110673 A1 | 5/2005 | Izumi et al. | |
| 2005/0195383 A1 | 9/2005 | Breed et al. | |
| 2005/0231420 A1 | 10/2005 | Brookner et al. | |
| 2005/0285773 A1 | 12/2005 | Hartzstein et al. | |
| 2006/0066474 A1 | 3/2006 | Shirakawa | |
| 2006/0092076 A1 | 5/2006 | Franson et al. | |
| 2006/0181448 A1 | 8/2006 | Natsume et al. | |
| 2007/0152874 A1 | 7/2007 | Woodington | |
| 2007/0182619 A1 | 8/2007 | Honda et al. | |
| 2007/0205938 A1 | 9/2007 | Zimmermann et al. | |
| 2007/0222662 A1 | 9/2007 | Toennesen et al. | |
| 2007/0241978 A1 | 10/2007 | Cheng | |
| 2008/0046150 A1 | 2/2008 | Breed | |
| 2008/0291080 A1 * | 11/2008 | Wilens et al. | 342/176 |
| 2008/0303711 A1 | 12/2008 | Matsuoka | |
| 2008/0312830 A1 | 12/2008 | Liu et al. | |
| 2010/0033389 A1 | 2/2010 | Yonak et al. | |
| 2010/0149061 A1 | 6/2010 | Haziza | |
| 2011/0074620 A1 | 3/2011 | Wintermantel | |
| 2011/0074621 A1 | 3/2011 | Wintermantel | |
| 2011/0080313 A1 | 4/2011 | Wintermantel et al. | |
| 2011/0080314 A1 | 4/2011 | Wintermantel | |
| 2011/0181456 A1 * | 7/2011 | Luebbert et al. | 342/70 |

FOREIGN PATENT DOCUMENTS

| | | |
|---|---|---|
| DE | 195 46 653 | 6/1997 |
| DE | 102005042729 | 3/2007 |
| DE | 102007008944 | 9/2007 |
| EP | 0 831 553 | 3/1998 |
| EP | 0 947 852 | 10/1999 |
| EP | 1 548 458 | 6/2005 |
| JP | 09-080148 A | 3/1997 |
| JP | 2004-198312 | 7/2004 |
| KR | 1020070099195 | 10/2007 |
| WO | WO 2008/040341 | 4/2008 |

OTHER PUBLICATIONS

PCT International Preliminary Report on Patentability including English Translation of PCT Written Opinion of the International Searching Authority for International Application PCT/DE2010/000417, issued Nov. 1, 2011, 10 pages, International Bureau of WIPO, Geneva, Switzerland.

Andrzej Wojtkiewicz et al., "Two-dimensional signal processing in FMCW radars", XXth National Conference "Circuit Theory and Electronic Networks", Kolobrzeg, Poland, Oct. 21-24, 1997, pp. 475 to 480.

Daniel T. McGrath, "Calculation of Coupling Coefficients for Arrays With Skewed Lattices From Infinite Array Scan Reflection Data", IEEE Transactions on Antennas and Propagation, vol. 55, No. 7, Jul. 2007, pp. 2116-2119, IEEE Service Center, Piscataway, NJ, USA.

M. M. Abousetta et al., "On the use of some FMCW transmission schemes for radar angular resolution improvement", Radar 92 International Conference, Brighton UK, Jan. 1, 1992, pp. 335-339, BNSDOCID: XP006514831.

Office Action in Japanese Patent Application No. 2012-502452, mailed Oct. 8, 2013, 4 pages, with English translation, 3 pages.

\* cited by examiner

RADAR SYSTEM HAVING ARRANGEMENTS AND METHODS FOR THE DECOUPLING OF TRANSMITTING AND RECEIVING SIGNALS AND FOR THE SUPPRESSION OF INTERFERENCE RADIATION

FIELD OF THE INVENTION

The invention relates to a radar system for the use for driver assistance systems in a motor vehicle. According to the invention, the radar system has arrangements and methods for the decoupling of transmitting and receiving signals and for the suppression of interference radiation.

BACKGROUND INFORMATION

Motor vehicles are being increasingly equipped with driver assistance systems that cover the surroundings by means of sensor systems and derive automatic vehicle reactions from the traffic situation detected in this manner and/or instruct (in particular warn) the driver, wherein a distinction between comfort functions and safety functions is made.

FSRA (Full Speed Range Adaptive Cruise Control) is the most important comfort function as far as present development is concerned. The vehicle adjusts the ego-velocity to the desired velocity predetermined by the driver if said adjustment is possible in the present traffic situation. Otherwise, the ego-velocity is automatically adjusted to the traffic situation.

Besides increased comfort, safety functions will be more and more important in future, wherein a reduction of the length of the brake path in emergency situations will probably play the most important role. The corresponding driver assistance functions range from prefilling the brake automatically for reducing brake latency via an improved Brake Assist System (BAS+) to autonomous emergency braking.

Nowadays, radar sensors are used in most driver assistance systems of the type described above. Said radar sensors reliably operate even in bad weather and are capable of measuring the distance between objects as well as of directly measuring the relative velocity of the objects by means of the Doppler effect.

These radar sensors are still rather expensive, and the detection quality thereof is not perfect, which is very critical particularly with respect to safety functions. Reasons thereof are, for example:

For precisely determining the lateral position of objects, radiation lobes directed in many different directions are required. This is being increasingly realized by using several transmitting and/or receiving antennas integrated in one sensor, wherein a planar design is preferred. Said transmitting and/or receiving antennas are operated in a parallel or quasi-parallel manner. For preventing the antennas from influencing each other, they must be decoupled or isolated very well, which has not been realized in a satisfying manner so far, not even by using expensive circuitry.

One example are 24-GHz UWB sensors (UWB=Ultra Wide Band). The very restrictive frequency allocation only allows the radiation of a very low transmitting power, which results in the fact that the amount of power unintentionally radiated by the actual receiving antennas on account of insufficient isolation comes close to the amount of power radiated by the transmitting antennas. This may result in problems with respect to the azimuth angle estimation of objects and in sensitivity losses in particular angle regions.

If several antennas are used, several parallel receiving paths are implemented, which makes analog and digital signal processing very expensive.

Interference coupling or interference radiation (caused by other systems) in the radar frequency range or in the range in which the low-frequency part of the electronic evaluation unit operates may result in incorrect detection and thus in wrong reactions.

SUMMARY OF THE INVENTION

The object of the invention is to provide a radar system and a method for a motor vehicle that suppresses the effect of interference radiation.

The suppression of interference radiation particularly comprises the decoupling or isolation of transmitting and receiving signals, which results in a precise determination of the lateral position of objects and in the avoidance of sensitivity losses. The suppression of interference radiation is also comprised.

The advantages of the invention result from reduced demands, particularly on the high-frequency electronic components and on the components of analog and digital signal processing, which reduces the costs of the radar system. Further advantages of the invention result from an improved and robust detection quality.

DETAILED DESCRIPTION OF EXAMPLE EMBODIMENTS OF THE INVENTION

In the following, the invention will be explained on the basis of exemplary embodiments of radar systems. The invention described in the embodiments and the indicated numerical examples refer to a 24-GHz radar. However, it is not intended to restrict the invention to the 24-GHz range but the invention is claimed for high-frequency radar systems and can be easily realized by a person skilled in the art with other frequencies as well, e.g., with 77 GHz.

Figure 1:
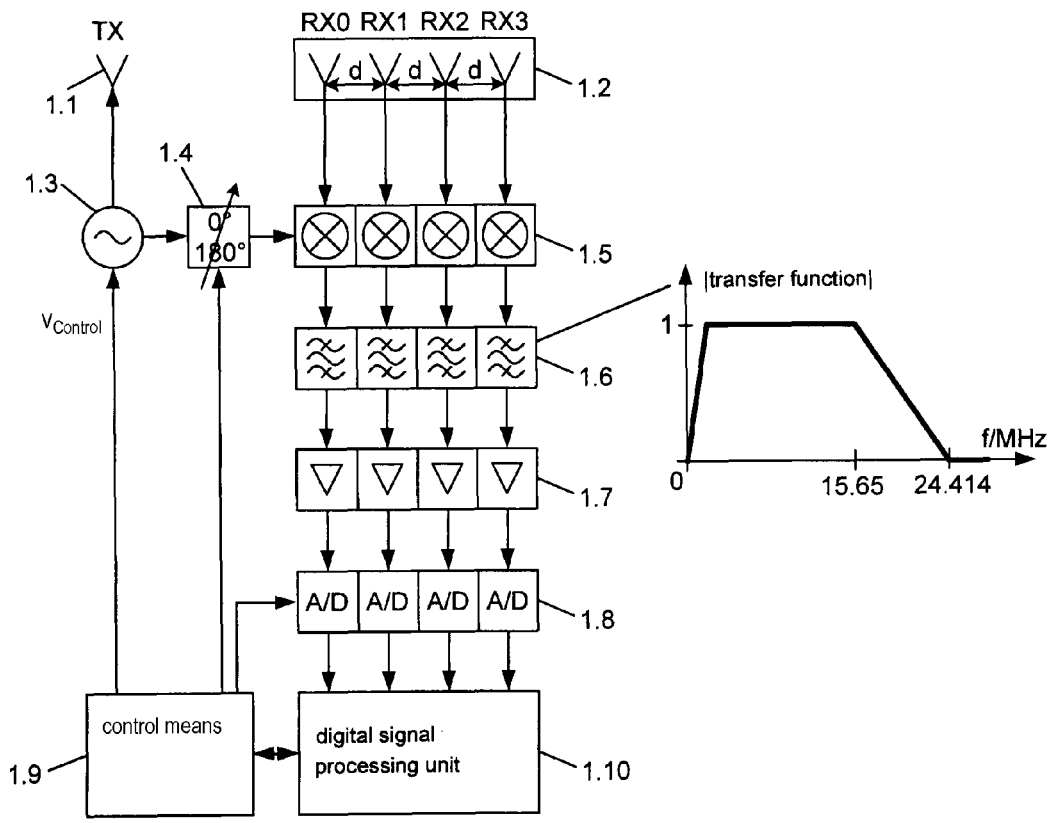
FIG. 1 shows the first embodiment of a radar system.

Embodiment 1 According to FIG. 1

The first exemplary embodiment is the radar system that is roughly illustrated in FIG. 1. The radar system has a transmitting antenna 1.1 for the radiation of transmitting signals and a plurality of, in particular, receiving antennas 1.2 for the simultaneous reception of transmitting signals that are reflected from objects.

The following exemplary embodiment is one with four receiving antennas but can be easily realized with any plurality of receiving antennas or with at least one receiving antenna.

All antennas (transmitting and receiving antennas) have the same beam shape with respect to elevation and azimuth. The four receiving antennas are located in the same plane, and each of them has the same lateral, i.e., horizontal spacing d.

The transmitting signals are obtained from the high-frequency oscillator 1.3 in the 24-GHz range. The frequency of the oscillator 1.3 can be changed by means of a driving voltage or control voltage $v_{control}$. The driving or control voltage is generated in the driving or control means 1.9. The signals received by the receiving antennas 1.2 are mixed, also with the signal of the oscillator 1.3, down to the low-frequency range in the real-valued mixers 1.5. Moreover, the phase of the oscillator signal may be rotated by 180° by means of the switchable inverter 1.4, or it may be left unchanged (the switchable inverter is driven by the driving or control means 1.9). After that, each of the received signals passes through a band-pass filter 1.6 with the transfer function shown, an amplifier 1.7 and an A/D converter 1.8, followed by further processing thereof in a digital signal processing unit 1.10.

Figure 2:
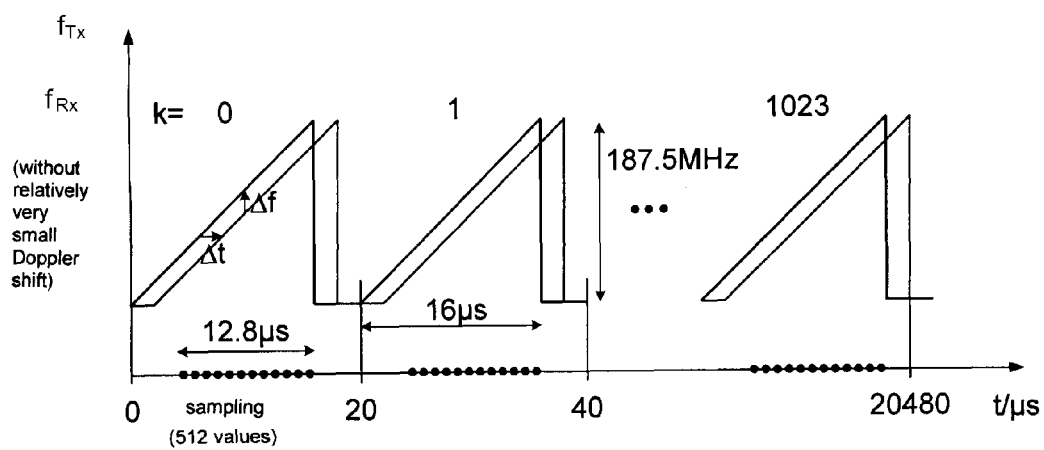
FIG. 2 shows the frequency of the transmitting and receiving signals that consists of so-called frequency ramps.

In order to be able to measure the distance of objects, the frequency of the high-frequency oscillator (and thus of the transmitted signals) is linearly changed very quickly (so-called frequency ramp), e.g., by 187.5 MHz within 16 μs (see FIG. 2). The frequency ramps are repeated periodically, e.g., every 20 μs, which means that there are a total of 1024 frequency ramps in the present numerical example.

The received signal, also called the receiving signal of an individual object is, after mixing and thus also at the A/D converter, a sinusoidal oscillation for each frequency ramp and for each of the four receiving channels, which can be explained by means of FIG. 2 as follows: If the object has a radial relative velocity of zero relative to the radar system, the frequency difference $\Delta f$ between the transmitted signal $f_{Tx}$ and the received signal $f_{Rx}$ is constant and proportional to the signal propagation time $\Delta t$ and thus proportional to the radial distance $\Delta r = c \cdot \Delta t/2$, wherein c is the velocity of light and the factor ½ takes into consideration that the propagation time $\Delta t$ refers to the outward travel and return travel of the wave. For example, the frequency difference $\Delta f$ is $\Delta f = 2r/c \cdot 187.5$ MHz/16 μs=r·78.125 kHz/m for the design mentioned above. Since the received signal is mixed in each receiving channel with the oscillator frequency and thus with the transmitting frequency $f_{Tx}$, there is respectively one sinusoidal oscillation after the mixer, said oscillation having the frequency $\Delta f$. This frequency is in the MHz range, and it is shifted by the Doppler frequency when there is a non-vanishing or non-imperceptible (radial) relative velocity. However, the Doppler frequency is in the kHz range only. Therefore, it is approximately negligible as compared to the frequency component due to the object distance. If there are several objects, the receiving signal consists of several superimposed sinusoidal oscillations of different frequencies.

The receiving signals are sampled, at the A/D converter, e.g., 512 times at an interval of, e.g., 25 ns each (i.e., with 40 MHz) during each frequency ramp in all four receiving channels (see FIG. 2). FIG. 2 shows that signal sampling is only useful in that time range in which receiving signals arrive from objects in the distance range of interest i.e., at least the propagation time that corresponds to the maximally interesting distance must elapse after the start of the ramp (this corresponds to 1.25 μs for a maximum distance of 200 m).

Figure 3:
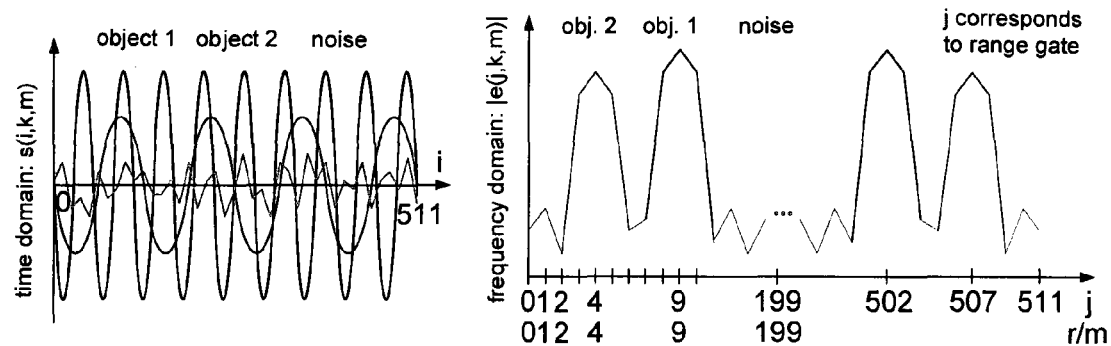
FIG. 3 shows a sampled signal in the presence of two objects prior to the first DFT (left) and after the first DFT (right).

After that, a discrete Fourier transform (DFT) in the form of a fast Fourier transform (FFT) is formed over the, e.g., 512 sampled values of each frequency ramp and of each receiving channel, whereby objects in different distances resulting in different frequencies can be separated (see FIG. 3: signal prior to DFT in the presence of two objects (left) and after DFT (right), wherein k is the control variable over the 1024 frequency ramps and m is the control variable over the four receiving channels RXm). Each of the discrete frequency control points j of the DFT corresponds to a distance r. Therefore, it can be also called a "range gate" (by analogy with pulse radar). In the design mentioned above, the range gates have an interspace and thus a width of just one meter (results from r·78.125 kHz/m=1/(12.8 μs)). In the DFT, power peaks occur in the range gates in which objects are present. Since the sampled receiving signals are real-valued and the upper transition region of the analog band-pass filters 1.6 has a frequency bandwidth of, e.g., 8.764 MHz (corresponds to the range of 112 frequency control points), only 200 of the 512 discrete frequency control points can be processed in this numerical example. Note that filter transition regions cannot have any desired or arbitrary narrowness. The filters 1.6 damp small frequencies and thus receiving signals from close objects in order to avoid the overdriving of the amplifiers 1.7 and the A/D converters 1.8 (the intensity of the signals received at the antennas increases with decreasing object distance).

Figure 4:
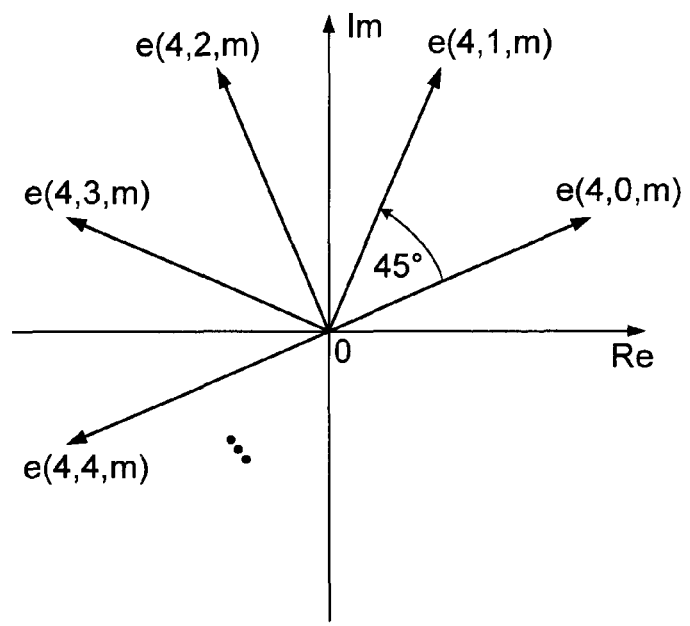
FIG. 4 shows the complex spectral value in range gate 4 in which exactly one object is present, said complex spectral value rotating over the frequency ramps.

Complex spectral values e(j,k,m) occur over the, e.g., 1024 frequency ramps (k=0, 1, . . . , 1023) in each receiving channel m (m=0, 1, 2, 3) for each range gate j (i.e., each of the, e.g., 200 considered frequency control points). If there is exactly one object at the distance that corresponds to a range gate, the complex spectral value in this range gate j rotates over the, e.g., 1024 frequency ramps at the Doppler frequency since the distance (in the mm range or below that) and thus the phase position of the associated oscillation uniformly changes from frequency ramp to frequency ramp. The phase change of 45° per frequency ramp (see example in FIG. 4) corresponds to a distance change of the object of $\lambda/(8\cdot 2)=0.78$ mm, wherein the wavelength in this numerical example is $\lambda=c/24.15$ GHz=12.4 mm and the factor 2 in the denominator takes the outward travel and return travel of the waves into consideration from which the relative velocity $v_{rel}=0.78$ mm/20 μs=140 km/h results. Several objects of different relative velocities in the same range gate are separated by forming, for each receiving channel and for each range gate, a second DFT over the complex spectral values occurring in the, e.g., 1024 frequency ramps. Each of the discrete frequency control points l of this second DFT corresponds to a set of Doppler frequencies. Because of the sampling of the Doppler frequency, it can be determined down to an unknown integral multiple of its sampling frequency only and thus a set of relative velocities $v_{rel}$ of objects so that the discrete frequency control points of the second DFT can be called "relative-velocity gates". In the exemplary design considered herein, the set of possible relative velocities always includes only one relative velocity that is useful or possible with respect to road traffic (see FIG. 5). The second DFT is not only used for determining the relative velocity but also increases detection sensitivity (by about $10 \cdot \log_{10}(1024)=30$ dB if there are 1024 frequency ramps) because of its integration.

Figure 5:
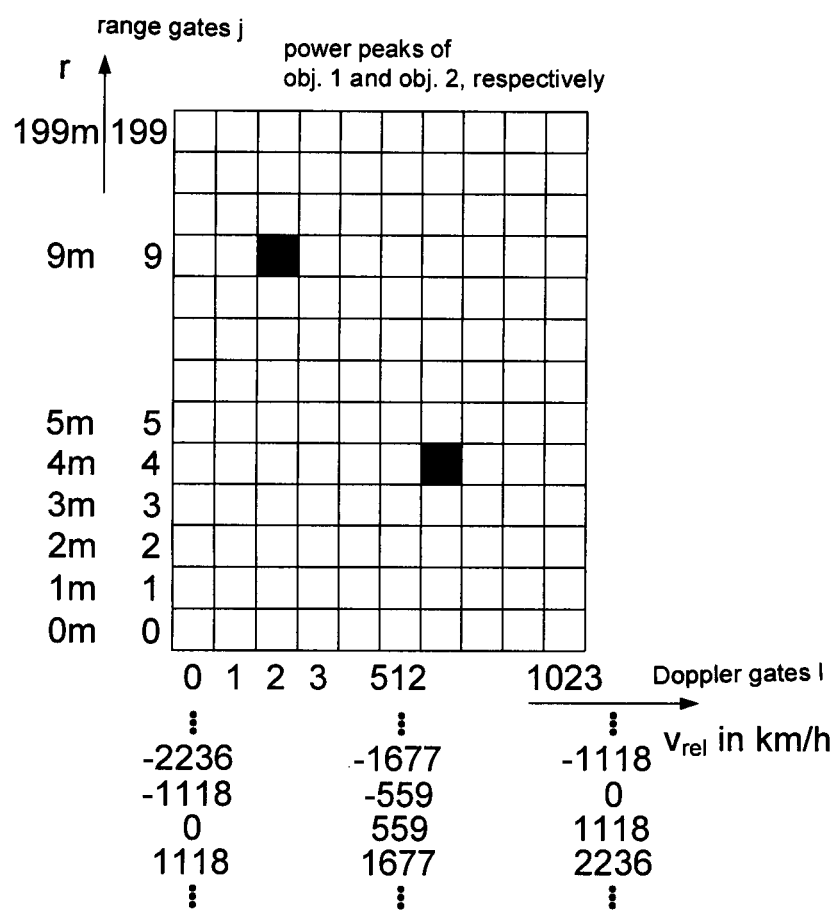
FIG. 5 shows the two-dimensional complex-valued spectrum after the second DFT.

The result of this second DFT for the relative velocities is a two-dimensional complex-valued spectrum for each receiving channel, wherein the individual cells can be called "range—relative-velocity gates" and power peaks caused by objects occur at the respective associated range—relative-velocity gate (see FIG. 5).

Figure 6:
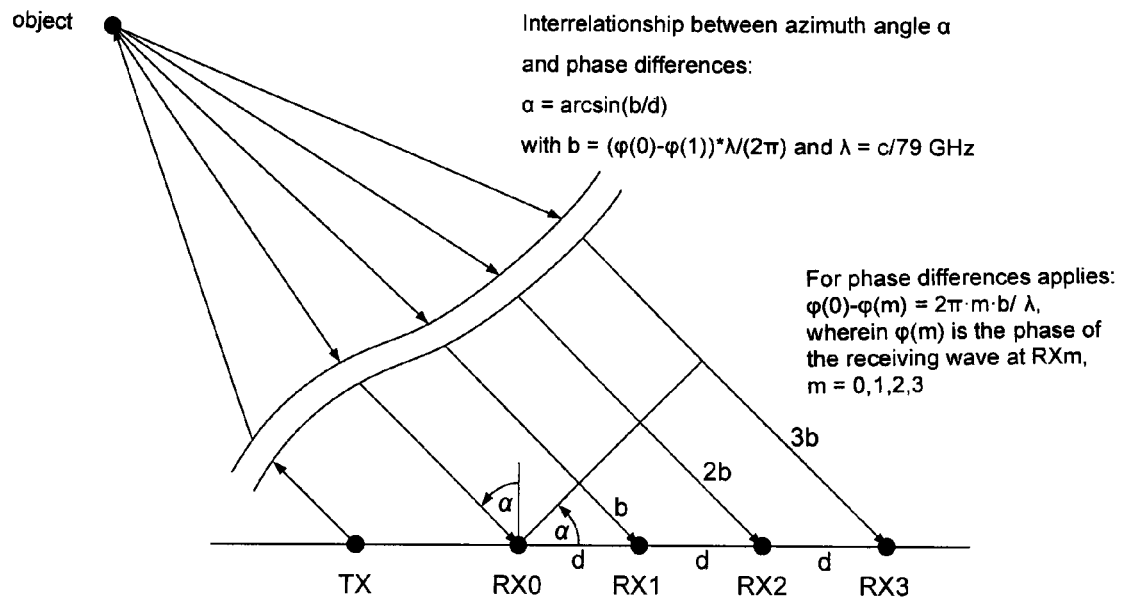
FIG. 6 explains the different phase positions at the four receiving antennas and their interrelationship with the azimuth angle.

Finally, the information from the four receiving channels (to the four receiving antennas) is merged. The wave radiated by the transmitting antenna and reflected from an individual object arrives at the four receiving antennas m, m=0, 1, 2, 3, with different phase positions $\phi(m)$ in dependence on the azimuth angle $\alpha$ since the distances between the object and the receiving antennas are slightly different. Because of the horizontal equidistance of the receiving antennas, the phase differences linearly increase/decrease over the four receiving antennas (see FIG. 6). Aside from any constant and thus compensatable phase shifts, these phase differences continue to exist until after the second DFT so that digital beam shaping can be performed in each range—relative-velocity gate via the four receiving channels. For this purpose, sums are formed over the complex values of the four receiving channels, and each of them is multiplied by a set of complex factors with a linearly increasing phase. In dependence on the linear phase change of the respective set of factors, radiation lobes with different beam directions are formed. The beam width of these radiation lobes is considerably smaller than that of the individual receiving antennas. The summation described above is realized by, e.g., an 8-point DFT, wherein the four values of the four receiving channels are filled with four zeros. The discrete frequency values of this DFT correspond to different azimuth angles. Therefore, they can be called "angle gates" n (e.g., n=0, 1, . . . 7).

Figure 7:
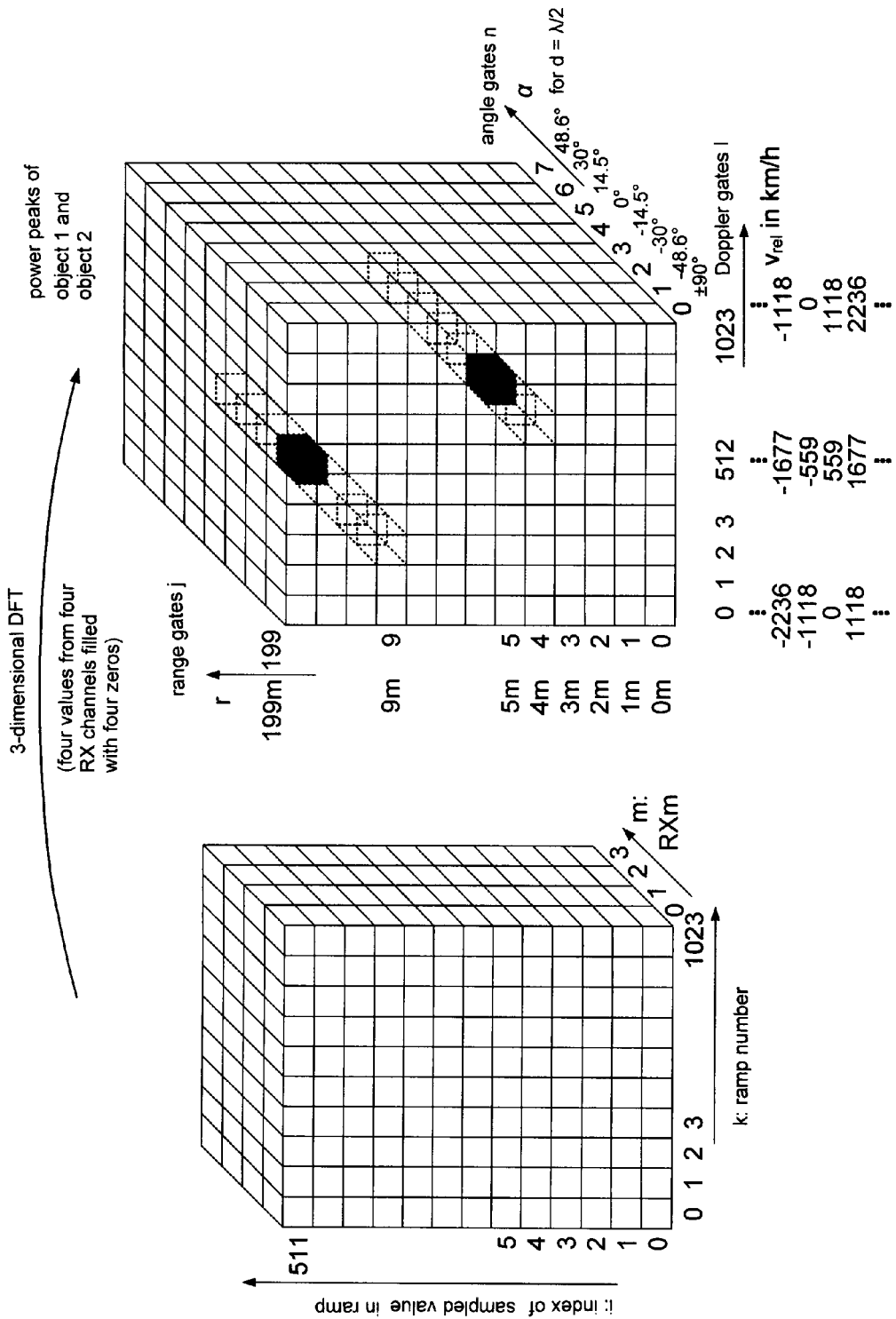
FIG. 7 shows the data prior to the three-dimensional DFT (left) and the three-dimensional complex-valued spectrum thereafter (right).

The result of this third DFT for the azimuth angles is a three-dimensional complex-valued spectrum, wherein the individual cells can be called "range—relative-velocity—angle gates" and power peaks caused by objects occur at the respective associated range—relative-velocity—angle gate (see FIG. 7: data prior to three-dimensional DFT (left) and thereafter (right)), i.e., the determination of the power peaks enables objects to be detected and the object quantities "distance", "relative velocity" (aside from any ambiguities, see above) and "azimuth angle" to be determined. Since power peaks still have levels even in adjacent cells on account of the DFT windowing, the object quantities can be determined much more precisely than the gate widths by interpolation in dependence on these levels. Note that the window functions of the three discrete Fourier transforms are selected such that, on the one hand, the power peaks do not become too broad in order to achieve sufficient object separation but, on the other hand, the secondary lobes of the window spectra do not become too high in order to be able to detect also weakly reflective objects in the presence of highly reflective objects. As a fourth object quantity, the reflection cross-section of the object can be estimated from the height of the power peaks. The reflection cross-section indicates the intensity of the reflection of the radar waves from the object. The described detection of objects and the determination of the associated object quantities represent a measuring cycle and provide an instantaneous image of the surroundings, which is cyclically repeated, e.g., approximately every 30 ms.

In real radar systems, interference coupling or interference radiation occurs in the radar frequency range (e.g., 24 GHz) or in the range in which the low-frequency part of the electronic evaluation unit operates or is sensitive (e.g., approximately in the range of 50 Hz to 1 GHz). These interferences can be caused by other systems or by the radar system itself. Examples for such interferences are:

- radiation from radar systems that operate in the same high-frequency range; such radiation penetrates via the receiving antennas;
- radiation or coupling caused by other systems in the low-frequency range (e.g., by radio systems outside the vehicle or by other systems in the vehicle), said radiation or coupling penetrating via the casing that is not ideally shielded or via the on-board feed lines;
- interfering signals caused by the radar system itself (e.g., the cycle of voltage regulators) that couple into the low-frequency receiving channels.

If no special measures are taken, all these interferences may result in the supposed detection of objects that do not exist in reality (ghost objects), which may result in wrong reactions of driver assistance functions. For example, if the 500-kHz cycle of a voltage regulator equally couples into all four receiving channels, the result will be a power peak in the three-dimensional spectrum (after the third DFT), said power peak resulting in the detection of an object at a distance of a bit more than 6 m, at an azimuth angle of 0° and at a relative velocity of 0 km/h. If the FSRA function (Full Speed Range Radar) is implemented with the radar system, this supposed detection consists in the erroneous and permanent detection of a vehicle driving ahead of the ego-vehicle at a very short distance from the ego-vehicle and at the same velocity as the ego-vehicle. The ego-vehicle slows down relative to the vehicle driving ahead in order to achieve a sufficiently big distance therefrom. However, since the distance from and the relative velocity of this ghost object never change (it slows down more or less at the same rate as the ego-vehicle), the ego-vehicle is almost slowed down to a standstill, which is of course unacceptable and may also become critical with respect to safety.

For avoiding the problem described above, the phase of the oscillator signal used for mixing is rotated at random from ramp to ramp by 180° by means of the switchable inverter 1.4, or it is left unchanged. The selected setting of the switchable inverter remains constant within each ramp. This results in the phases of the receiving signals equally varying after mixing, i.e., they are rotated by 180° or they are not. For frequency ramps where inversion has taken place, this must be corrected later (e.g., after the first DFT) by just multiplying the respective values by −1 (corresponds to a reversed rotation by 180°). After that, the useful signals resulting from reflections from objects are coherently reintegrated in the three discrete Fourier transforms. The result is the same three-dimensional spectrum as without random inversion with power peaks at the corresponding range—relative-velocity—angle gates.

The coupling into the low-frequency receiving channels (caused by, e.g., a 500-kHz cycle of a voltage regulator) is coherent prior to the correction of the phase variations over the ramps but becomes non-coherent after the correction by the ramp-to-ramp random multiplication by −1 or +1 so that said coupling does not result in a power peak any more because of the integration over the ramps taking place in the second DFT and the third DFT, but its power is distributed at random among all discrete frequency control points and thus represents white noise. Said noise occurs in the three-dimensional spectrum in all cells of the range gate for 6 m and, at a reduced level, in the one or two preceding and one or two subsequent range gates. There is no increased noise in the cells of other range gates since the coupling is coherent within each ramp and is therefore not transformed into noise by the first DFT, yet. In the exemplary design described above (a total of 1024 ramps), the noise caused by the coupling is approximately $10 \cdot \log_{10}(1024) \approx 30$ dB below the power peaks that the coupling would generate without the phase variation.

Figure 8:
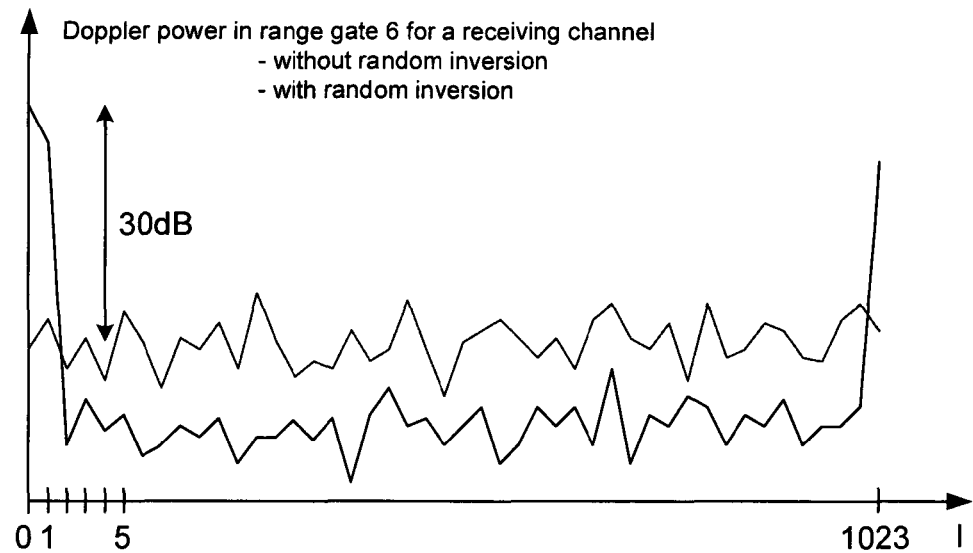
FIG. 8 shows, for an intensive 500-kHz coupling, the Doppler spectrum of a receiving channel in the affected range gate 6 with and without random inversion.

This is shown for an intensive 500-kHz coupling in FIG. 8. If this noise were above system noise (as shown in FIG. 8), the sensitivity of the radar system would be reduced. However, such intensive coupling can be avoided by a suitable circuitry layout.

The same principle applies to the other interference coupling or interference radiation mentioned above. Because of the random inversion, said coupling or radiation only results in possibly increased noise in few range gates (if the noise generated by it is above system noise) but does not result in ghost objects.

Figure 10:
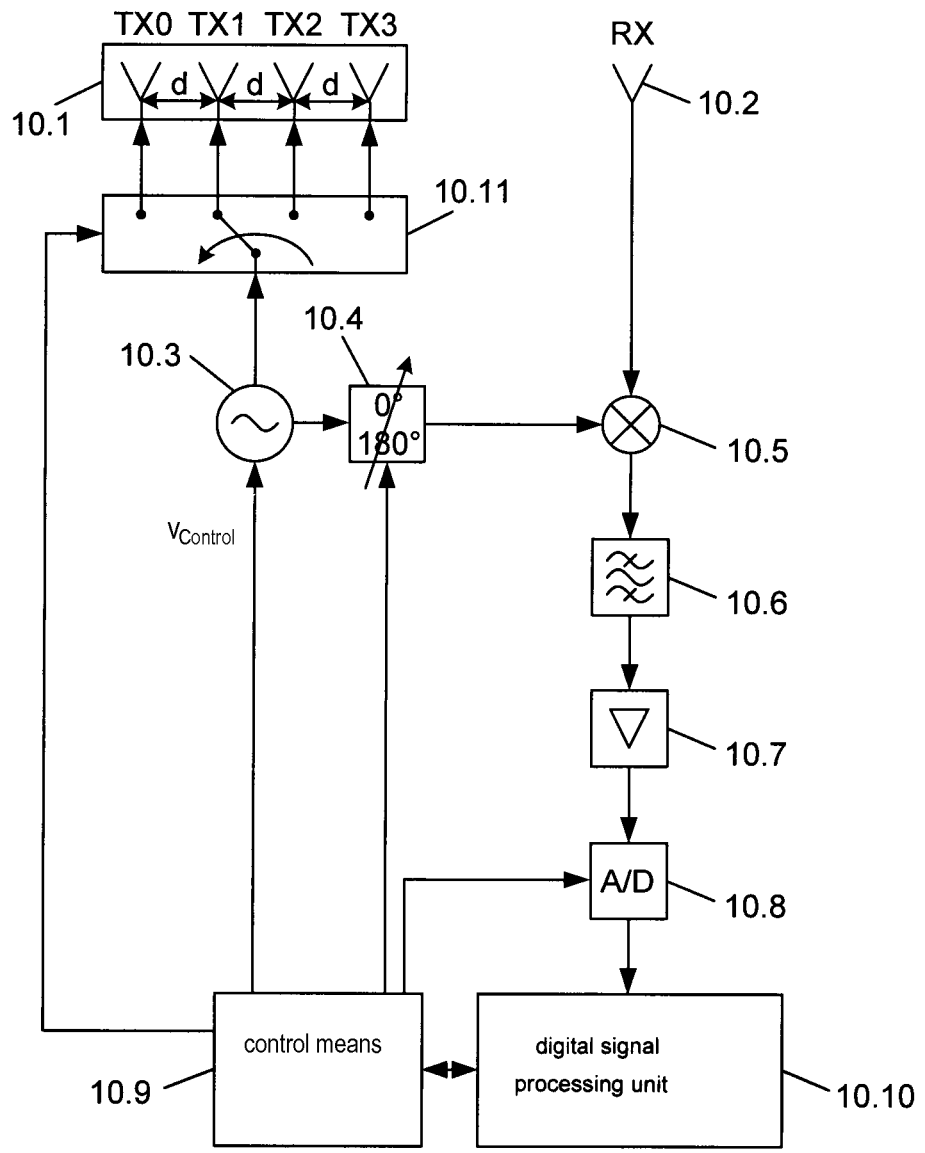
FIG. 10 shows the second embodiment of a radar system.

Embodiment 2 According to FIG. 10

So far, the ideal case (power is only radiated by transmitting antenna 1.1) has been discussed (see embodiment 1 according to FIG. 1). In fact, however, power is also radiated by the receiving antennas 1.2 since the mixers 1.5 do not ideally isolate, i.e., a part of the input power of the mixer obtained from the oscillator leaks from the mixer to the receiving antennas and is radiated by them.

Figure 9:
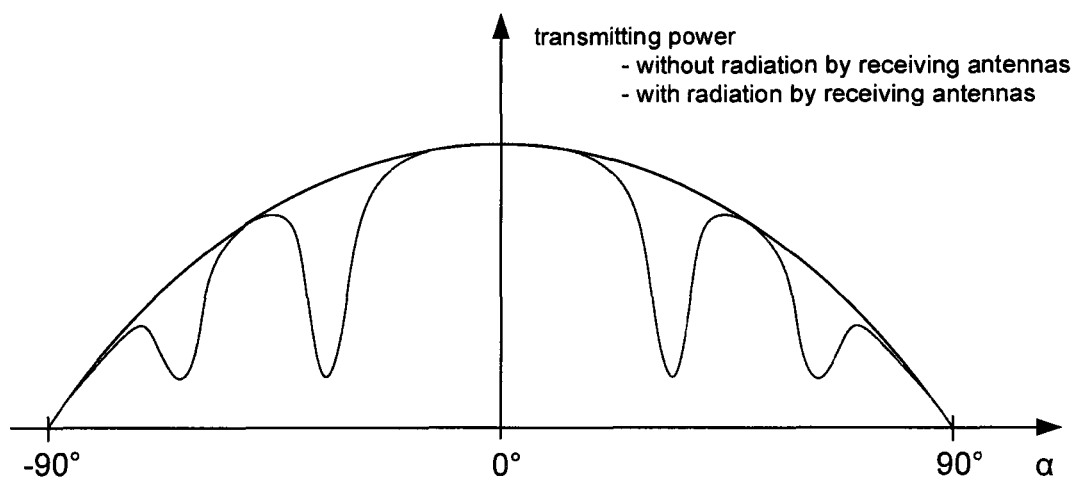
FIG. 9 shows the transmitting-antenna diagram with and without the power unintentionally radiated by the receiving antennas.

For 24-GHz narrow-band radar systems operating in the so-called ISM band, the amount of power outputted to the transmitting antennas by the oscillator at least equals the amount of power outputted to the mixers. Since the mixers typically have an isolation of at least 20 dB, the power radiated by the receiving antennas is negligible as against the actual transmitting power (radiated by the transmitting antennas). For 24-GHz wide-band radar systems (so-called UWB radar systems), frequency allocation is very restrictive. It only allows the radiation of a very low transmitting power, which results in the fact that the amount of power unintentionally radiated by the actual receiving antennas on account of insufficient isolation comes close to the amount of power radiated by the transmitting antennas. This may result, in the arrangement according to FIG. 1, in sharp declines in the resulting transmitting-antenna diagram that takes both power components mentioned above into consideration (see FIG. 9), which results in the radar system being very insensitive in particular azimuth directions so that at least weakly reflective objects are not detected any more and thus cannot be seen at these azimuth angles.

The following exemplary embodiment can be easily realized for a radar system with a plurality of transmitting antennas and at least one receiving antenna and will be presented on the basis of an embodiment with one receiving antenna and four transmitting antennas.

Therefore, the radar system shown in FIG. 10 will be discussed in the following. It essentially differs from the original radar system (embodiment 1) in having only a single receiving antenna (instead of four) but having four equidistant transmitting antennas located in the same plane (instead of one). The four transmitting antennas 10.1 are sequentially operated by means of a multiplexer 10.11. Only one antenna 10.1 transmits in each ramp, wherein the respective next antenna is switched over to from ramp to ramp. With the same total of ramps (1024), 256 ramps are radiated by each transmitting antenna 10.1. Similarly as in FIG. 1, the received signals from the antenna 10.2 are mixed down with the high frequency signal from the oscillator 10.3 after it has been phase-shifted by a switchable inverter 10.4 as will be discussed below. Then the mixed signal is filtered through a band-pass filter 10.6, followed by amplification through an amplifier 10.7 and sampling through an A/D converter 10.8. Also in the present exemplary embodiment, in a digital signal processing unit 10.10, the signals are evaluated by means of a three-dimensional DFT, wherein there are two slight differences compared to the exemplary embodiment described above. On the one hand, the length of the second DFT is reduced to 256. On the other hand, a non-vanishing or non-imperceptible relative velocity of an object results in a linear phase offset between the receiving signals from the four sequentially driven transmitting antennas 10.1. This linear phase offset is superimposed on the linear phase offset by the azimuth angle of the object. Since the relative velocity is known after the second DFT, the phase offset caused by it can be deducted, e.g., prior to the third DFT or later. A control unit 10.9 controls or communicates with the multiplexer 10.11, the oscillator 10.3, the inverter 10.4, the A/D converter 10.8, and the digital signal processing unit 10.10.

Furthermore, a disadvantage of the radar system according to FIG. 10 during UWB operation without phase variations over the ramps consists in sharp declines occurring in the transmitting-antenna diagrams because of the unintentional radiation of power by the receiving antenna 10.2. A further problem is that this power radiated by the receiving antenna 10.2 significantly distorts angle formation, i.e., results in incorrect measuring of the azimuth angle of objects. The reason for this is that the power radiated by the transmitting antennas 10.1 and reflected from an object results in a linear phase offset over the four transmitting antennas 10.1 in the received signal in dependence on the azimuth angle of the object, which can be explained by analogy with FIG. 6. The power radiated by the receiving antenna 10.2 and reflected from an object has, in the receiving signal, a phase that is independent of the used transmitting antenna 10.1. Therefore, the receiving signal consists of a component with a linear phase offset over the transmitting antennas 10.1 and a constant component so that the sum does not have a linear phase offset over the transmitting antennas 10.1 any more, whereby an azimuth angle formation based on the assumption that there is a linear phase offset results in errors.

For avoiding both problems described above (declines occurring in the transmitting-antenna diagrams and incorrect azimuth angle formation), the phase of the oscillator signal from the oscillator 10.3 used for mixing in the mixer 10.5 can be rotated at random from ramp to ramp by 180° by means of the switchable inverter 10.4, or it can be left unchanged. The selected setting of the inverter 10.4 remains constant within each ramp. Over the ramps, this results in the power radiated by the receiving antenna 10.2 becoming uncorrelated and thus non-coherent to the power radiated by the transmitting antennas 10.1. Again, the power radiated by the receiving antenna 10.2 and reflected from objects results only in low noise in the corresponding range gates in the receiving signals. Said noise is approximately $10 \cdot \log_{10}(1024) \approx 30$ dB below the power that would result without the phase variation (i.e., in the case of a coherent integration by means of the second DFT and the third DFT over 1024 ramps).

Figure 11:
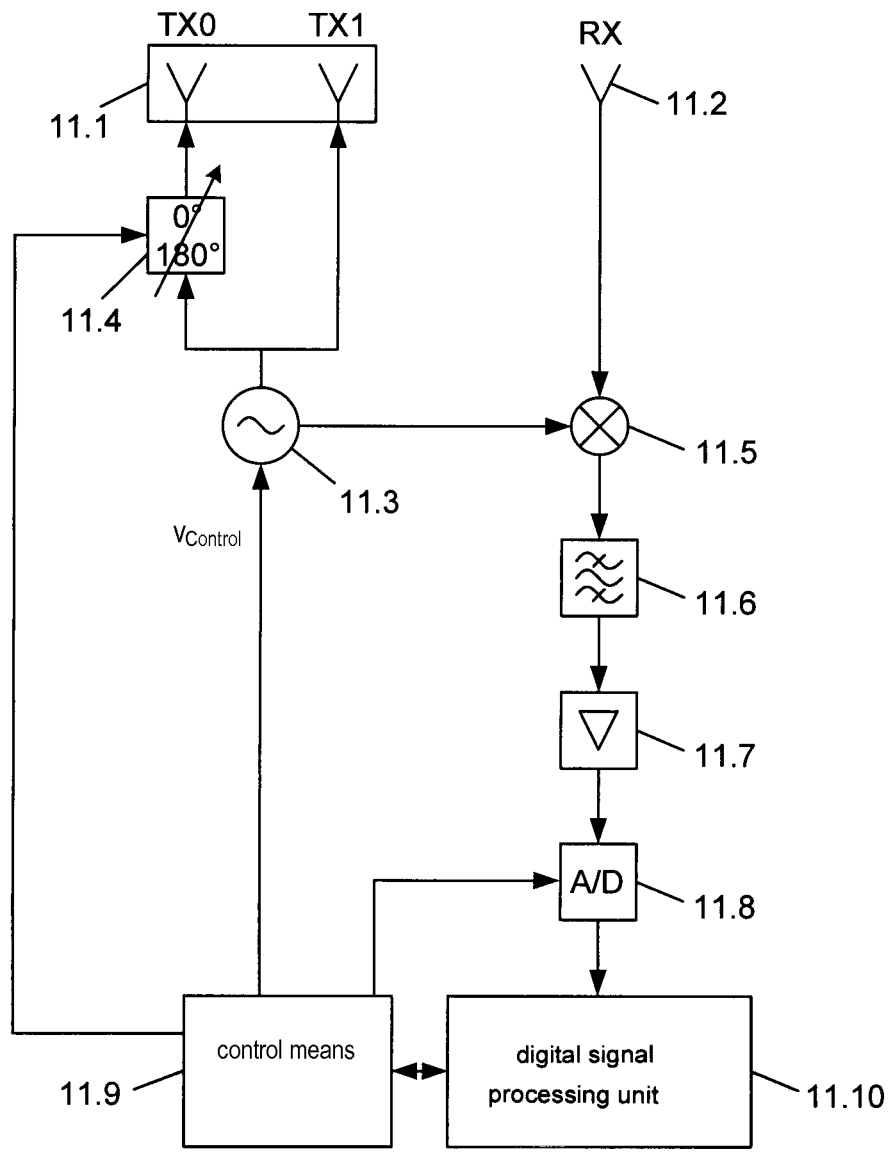
FIG. 11 shows the third embodiment of a radar system.

Embodiment 3 According to FIG. 11

The following exemplary embodiment can be easily realized for a radar system with a plurality of transmitting antennas and at least one receiving antenna and will be presented on the basis of an embodiment with one receiving antenna and two transmitting antennas.

The simpler radar system shown in FIG. 11 will be discussed in the following. It basically differs from the preceding radar system (embodiment 2) in:
  having only two transmitting antennas 11.1 (instead of four);
  both transmitting antennas 11.1 being operated simultaneously, i.e., each of the 1024 ramps being radiated by both antennas simultaneously so that no multiplexer is required;

the switchable inverter 11.4 being arranged before one of the two transmitting antennas 11.1 and not between the oscillator 11.3 and the mixer 11.5.

The switchable inverter 11.4 alternately varies the phase of the signal of the first transmitting antenna 11.1 TX0 from ramp to ramp by 0° and 180°, i.e., the signal is inverted in every second ramp and remains unchanged therebetween. The phase of the signal of the second transmitting antenna 11.1 TX1 is not varied. Similarly as above, the received signals from a receiving antenna 11.2 are mixed with the oscillator signals from the oscillator 11.3 (but without phase inversion), then the mixed signal is filtered through a band-pass filter 11.6, followed by amplification through an amplifier 11.7 and sampling through an A/D converter 11.8, before the further processing in a digital signal processor 11.10. The alternating phase of the signal of the first transmitting antenna 11.1 TX0 results in the receiving signals from this transmitting antenna being modulated at half the ramp recurrence frequency (25 kHz) over the ramps so that their Doppler frequency is also shifted by 25 kHz after the second DFT. The receiving signals from the second transmitting antenna 11.1 TX1 are not shifted in Doppler. For an object whose relative velocity corresponds to, e.g., a Doppler frequency of 5 kHz, the second DFT results in a power peak at 5 kHz for the receiving signals from the second transmitting antenna and a power peak at 30 kHz for the receiving signals from the first transmitting antenna. Thus, the components from the first transmitting antenna and from the second transmitting antenna can be separated on the basis of their frequencies after the second DFT. The component of the first transmitting antenna can be shifted back by 25 kHz, whereafter the third DFT (having a length of 2, for example) for angle formation can be performed.

Instead of the determinate alternating phase variation, there could be a random phase variation. In that case, however, the second DFT would have to be determined two times—one time with a correction of the phase variation and one time without said correction. In the DFT calculated with phase correction, the receiving signals from the first transmitting antenna would result in power peaks, whereas the receiving signals from the second transmitting antenna would generate noise that is approximately 30 dB below the power peaks. In the DFT calculated without phase correction, conditions would be vice versa. Because of that, the two components could be separated.

Figure 12:
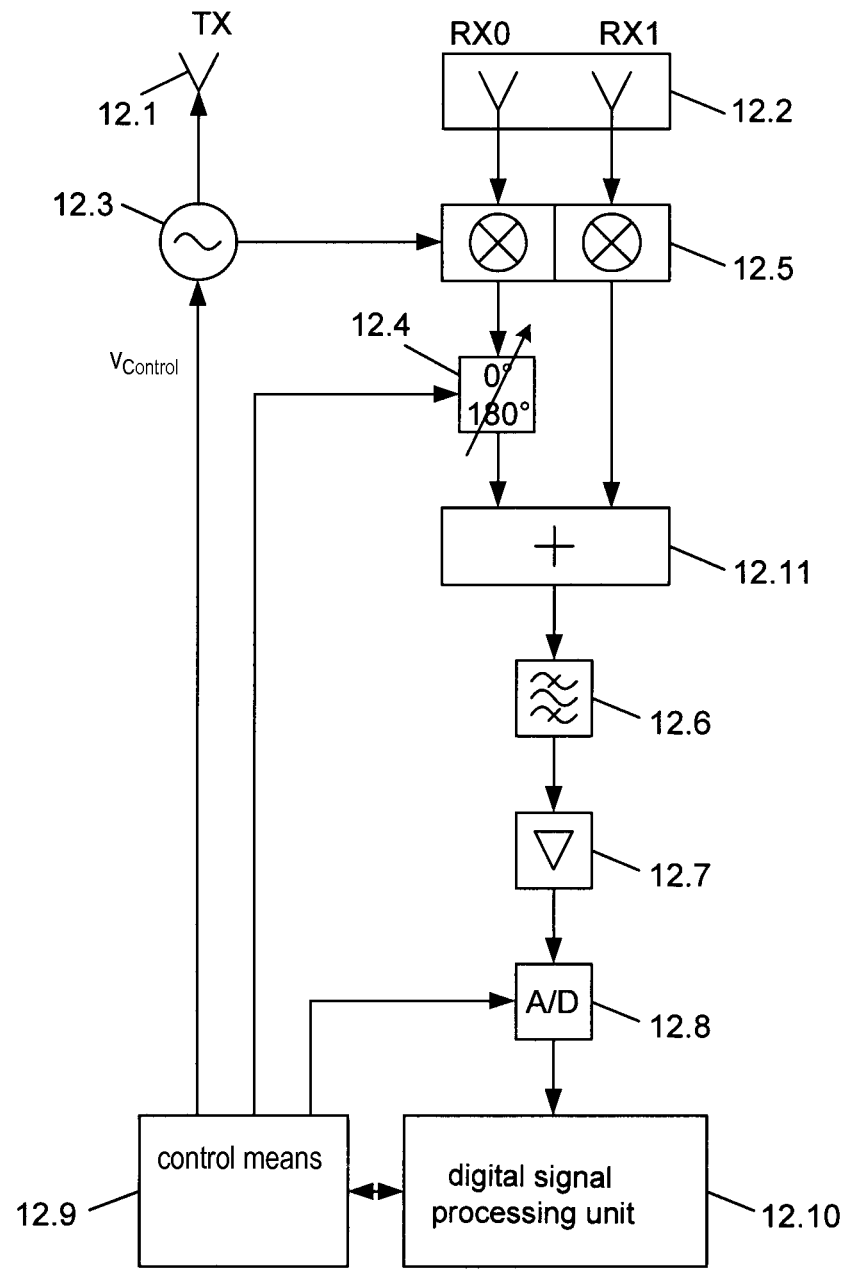
FIG. 12 shows the fourth embodiment of a radar system.

Embodiment 4 According to FIG. 12

The following exemplary embodiment can be easily realized for a radar system with at least one transmitting antenna and a plurality of receiving antennas and will be presented on the basis of an embodiment with one transmitting antenna and two receiving antennas.

Finally, the simple radar system shown in FIG. 12 will be discussed. It basically differs from the preceding radar system (embodiment 3) in:

- having only one transmitting antenna 12.1 (instead of two) but having two receiving antennas 12.2 (instead of one);
- the simultaneously received signals of both receiving antennas 12.2 being added in the adder 12.11 after the mixer 12.5, wherein the signal of the first receiving antenna 12.2 RX0 passes through the switchable inverter 12.4 before said adding (summation reduces the number of required receiving channels to one channel).

The switchable inverter 12.4 alternately varies the phase of the mixer output signal of the first receiving antenna 12.2 RX0 from ramp to ramp by 0° and 180°. Similarly as above, after the adder 12.11, the added signals are filtered through a band-pass filter 12.6, amplified through an amplifier 12.7, and sampled through an A/D converter 12.8, before the further processing in a digital signal processor 12.10. A control unit 12.9 controls or communicates with the abovementioned components 12.3, 12.4, 12.8 and 12.10. By analogy with the preceding exemplary embodiment 3, the Doppler frequency of the signal components from the first receiving antenna is shifted by half the ramp recurrence frequency after the second DFT. Thus, said components can be separated from the unshifted signal components of the second receiving antenna 12.2 RX1.

Final Remarks

The random variation of the phase position of the switchable inverter between 0° and 180° is realized by means of a binary feedback shift register having a length of 31. Inversion is performed if the output of the shift register is 1. No inversion is performed if the output is 0. Thus, the frequency of occurrence is the same for both states on average, and successive states (i.e., the respective phase variation from ramp to ramp) are uncorrelated to a very good approximation so that the noise in the three-dimensional spectrum caused by phase variation is white noise to a very good approximation. Since a shift register does not represent a pure random process (e.g., the period of the output sequence is $2^L$, wherein L is the length of the shift register), this process is more precisely called "pseudo-random process" very often.

Real objects are often extensive, and not every of the object has the same velocity relative to the radar system (particularly in dynamic situations in the near range) so that several different distances, azimuth angles and relative velocities of the same real object may be detected that relate to different parts of the object, i.e., the term "object" used herein possibly refers to parts of a real object only.

Finally it should be pointed out that the above considerations can of course be applied to other types of system architecture as well, e.g., a system with two transmitting antennas and four receiving antennas.

The invention claimed is:

1. A method of operating a radar system in a motor vehicle, wherein said radar system comprises a high frequency oscillator, at least one transmitting antenna, at least one receiving antenna, a mixer and a signal processing arrangement, and wherein said method comprises the steps:

a) with said oscillator, producing a high frequency signal comprising a succession of individual signal pulses;

b) with said at least one transmitting antenna, transmitting said succession of individual signal pulses as transmitted signal pulses into an environment outside said motor vehicle;

c) with said at least one receiving antenna, receiving received signal pulses formed by reflections of said transmitted signal pulses from at least one object in said environment, and producing a received signal comprising said received signal pulses;

d) providing a high frequency secondary signal from said oscillator to said mixer, providing said received signal to said mixer, and with said mixer mixing said received signal and said high frequency secondary signal and thereby producing a low frequency mixed signal comprising low frequency pulses representing said received signal pulses;

e) imposing a phase angle variation on a phase angle of at least some of said low frequency pulses in said low frequency mixed signal by at least one of: a substep e1) of varying a phase angle of at least some of said individual signal pulses of said high frequency signal before said transmitting, a substep e2) of varying a phase angle of said high frequency secondary signal before said providing thereof to said mixer, and a substep e3) of varying said phase angle of said at least some of said low frequency pulses directly in said low frequency mixed signal after said producing of said low frequency mixed signal;

f) processing said low frequency mixed signal in said signal processing arrangement, comprising performing at least one Fourier transformation on said low frequency mixed signal, including a first Fourier transformation to determine a distance of said at least one object relative to said motor vehicle, or including first and second Fourier transformations to determine a relative velocity of said at least one object relative to said motor vehicle; and g) during said processing, at least partially eliminating or suppressing an interference component that is further included in said low frequency mixed signal, based on said interference component not exhibiting said phase angle variation that was imposed on said phase angle of at least some of said low frequency pulses in said low frequency mixed signal, wherein said at least partial eliminating or suppressing of said interference component comprises reversing said phase angle variation imposed on said phase angle of at least some of said low frequency pulses by imposing, after said first Fourier transformation, a reverse phase angle variation on said phase angle of those of said low frequency pulses onto which said phase angle variation had been imposed.

2. The method according to claim 1, wherein said individual signal pulses comprise pulses of an amplitude of said high frequency signal over time, and wherein said step e) comprises said substep e1), which comprises varying said phase angle of said individual signal pulses respectively from pulse to pulse.

3. The method according to claim 1, wherein said individual signal pulses each respectively comprise a frequency ramp with a linearly varying frequency of said high frequency signal, and wherein said step e) comprises said substep e1), which comprises varying said phase angle of said individual signal pulses respectively from pulse to pulse.

4. The method according to claim 1, wherein said phase angle variation comprises varying said phase angle of said low frequency pulses from pulse to pulse and not during each respective one of said low frequency pulses.

5. The method according to claim 1, wherein said phase angle variation in said step e) comprises a 180° phase inversion of said phase angle of at least some of said low frequency pulses.

6. The method according to claim 1, wherein said phase angle variation in said step e) is imposed on alternate ones of said low frequency pulses.

7. The method according to claim 1, wherein said phase angle variation in said step e) is imposed on randomly or pseudo-randomly selected successive ones of said low frequency pulses.

8. The method according to claim 1, wherein said step e) comprises said substep e1).

9. The method according to claim 1, wherein said step e) comprises said substep e2).

10. The method according to claim 1, wherein said step e) comprises said substep e3).

11. The method according to claim 1, wherein said phase angle variation in said step e) is a fixed predetermined variation.

12. The method according to claim 1, wherein said phase angle variation in said step e) is a random variation or a pseudo-random variation.

13. The method according to claim 1, wherein said interference component is caused by said radar system or is imposed from outside of said radar system, and said interference component has a frequency in a high frequency range of said transmitted signal pulses or in a low frequency range of said low frequency pulses.

14. The method according to claim 1, wherein said at least one Fourier transformation performed in said processing in said step f) comprises said first and second Fourier transformations and a further third Fourier transformation performed in succession after one another, and wherein said imposing of said reverse phase angle variation is performed before said second Fourier transformation.

15. The method according to claim 1, wherein said transmitted signal pulses are transmitted from said at least one transmitting antenna simultaneously with said received signal pulses being received by said at least one receiving antenna, and said interference component comprises pulses caused by unintentional radiation from said at least one receiving antenna.

16. The method according to claim 1, wherein said at least one transmitting antenna comprises plural antennas or said at least one receiving antenna comprises plural antennas, said transmitting or said receiving is carried out with successive ones of said transmitted or received signal pulses respectively via said plural antennas operated in series or in parallel with one another, and said processing is further carried out to determine an angular direction of said at least one object.

17. The method according to claim 1, wherein said at least one transmitting antenna comprises plural antennas or said at least one receiving antenna comprises plural antennas, and said imposing of said phase angle variation comprises selecting and applying said phase angle variation so as to achieve a more-uniform detection sensitivity over all angular regions of detection by said at least one receiving antenna as compared to a less-uniform detection sensitivity achieved without said phase angle variation being imposed.

18. The method according to claim 1, wherein said processing comprises integrating said low frequency pulses, such that said interference component results in merely incoherent noise which has thereby been at least partially eliminated or suppressed in said step g).

19. The method according to claim 1, wherein said at least one receiving antenna comprises plural receiving antennas, said receiving of said received signal pulses is performed simultaneously with said plural receiving antennas to respectively produce a plurality of said received signals, said method further comprises summing said plural received signals before said mixing or summing a plurality of said low frequency mixed signal after said mixing, and said processing comprises at least partly separating from one another said plural received signals after said summing.

20. The method according to claim 1, wherein said at least one Fourier transformation performed in said step f) comprises only said first Fourier transformation to determine said distance.

21. The method according to claim 1, wherein said at least one Fourier transformation performed in said step f) comprises said first and second Fourier transformations to determine said relative velocity.

22. A method of operating a radar system in a motor vehicle, wherein said radar system comprises a high frequency oscillator, plural transmitting antennas, at least one receiving antenna, a mixer and a signal processing arrangement, and wherein said method comprises the steps:

a) with said oscillator, producing a high frequency signal comprising a succession of individual signal pulses;

b) simultaneously from said plural transmitting antennas, transmitting said succession of individual signal pulses as transmitted signal pulses into an environment outside said motor vehicle;
c) with said at least one receiving antenna, receiving received signal pulses formed by reflections of said transmitted signal pulses from at least one object in said environment, and producing a received signal comprising said received signal pulses;
d) providing a high frequency secondary signal from said oscillator to said mixer, providing said received signal to said mixer, and with said mixer mixing said received signal and said high frequency secondary signal and thereby producing a low frequency mixed signal comprising low frequency pulses representing said received signal pulses;
e) imposing a phase angle variation on a phase angle of at least some of said low frequency pulses in said low frequency mixed signal by at least varying a phase angle of at least some of said individual signal pulses of said high frequency signal before said transmitting, whereby said phase angles of said individual signal pulses transmitted from different ones of said plural transmitting antennas are respectively different relative to one another on an antenna-by-antenna basis;
f) processing said low frequency mixed signal in said signal processing arrangement to determine at least one of a distance and a relative velocity of said at least one object relative to said motor vehicle, wherein said processing comprises at least partly separating from one another said individual signal pulses transmitted respectively from different ones of said plural transmitting antennas as represented in said received signal produced by a single said receiving antenna; and
g) during said processing, distinguishing between a useful signal component and an interference component that are both included in said low frequency mixed signal, in that said interference component does not exhibit said phase angle variation that was imposed on said phase angle of at least some of said low frequency pulses in said low frequency mixed signal.

23. The method according to claim 22, wherein said processing comprises integrating said low frequency pulses, such that said interference component results in merely incoherent noise which is thereby at least partially eliminated or suppressed.

24. A method of operating a radar system in a motor vehicle, wherein said radar system comprises a high frequency oscillator, two transmitting antennas, at least one receiving antenna, a mixer and a signal processing arrangement, and wherein said method comprises the steps:
a) with said oscillator, producing a high frequency signal comprising a succession of individual signal pulses;
b) simultaneously from said two transmitting antennas, transmitting said succession of individual signal pulses as transmitted signal pulses into an environment outside said motor vehicle;
c) with said at least one receiving antenna, receiving received signal pulses formed by reflections of said transmitted signal pulses from at least one object in said environment, and producing a received signal comprising said received signal pulses;
d) providing a high frequency secondary signal from said oscillator to said mixer, providing said received signal to said mixer, and with said mixer mixing said received signal and said high frequency secondary signal and thereby producing a low frequency mixed signal comprising low frequency pulses representing said received signal pulses;
e) imposing a phase angle variation on a phase angle of at least some of said low frequency pulses in said low frequency mixed signal by at least varying a phase angle of at least some of said individual signal pulses of said high frequency signal before said transmitting, whereby said phase angles of said individual signal pulses respectively transmitted from said two antennas are respectively different from one another;
f) processing said low frequency mixed signal in said signal processing arrangement to determine at least one of a distance and a relative velocity of said at least one object relative to said motor vehicle; and
g) during said processing, distinguishing between a useful signal component and an interference component that are both included in said low frequency mixed signal, in that said interference component does not exhibit said phase angle variation that was imposed on said phase angle of at least some of said low frequency pulses in said low frequency mixed signal.

25. The method according to claim 24, wherein said processing comprises integrating said low frequency pulses, such that said interference component results in merely incoherent noise which is thereby at least partially eliminated or suppressed.

* * * * *

UNITED STATES PATENT AND TRADEMARK OFFICE
CERTIFICATE OF CORRECTION

PATENT NO. : 9,182,476 B2
APPLICATION NO. : 13/256488
DATED : November 10, 2015
INVENTOR(S) : Markus Wintermantel It is certified that error appears in the above-identified patent and that said Letters Patent is hereby corrected as shown below:

In the specification

Column 3,
Line 19, after "voltage", replace "$v_{control}$" with --$v_{Control}$--;

Column 4,
Lines 15/16, after "Each of", there should be no paragraph break;

Column 9,
Line 15, after "11.10.", insert --A control unit 11.9 controls or communicates with the abovementioned components 11.3, 11.4, 11.8 and 11.10.--;
Line 22, after "shifted in", insert --the--;

Column 10,
Line 26, after "every", insert --part--.

Signed and Sealed this
Twelfth Day of July, 2016

Michelle K. Lee
*Director of the United States Patent and Trademark Office*